April 21, 1970 D. D. SCOTT 3,507,552
FLASHBLINDNESS PROTECTIVE APPARATUS
Filed Dec. 1, 1965

INVENTOR
DONALD D. SCOTT
BY Claude Funkhouser
ATTORNEY

United States Patent Office 3,507,552
Patented Apr. 21, 1970

3,507,552
FLASHBLINDNESS PROTECTIVE APPARATUS
Donald D. Scott, Silver Spring, Md., assignor to the United States of America as represented by the Secretary of the Navy
Filed Dec. 1, 1965, Ser. No. 511,300
Int. Cl. G02f 1/28, 1/36; G02b 5/20
U.S. Cl. 350—160                          14 Claims

ABSTRACT OF THE DISCLOSURE

A pair of contact lenses having photochromic liquid therein. The liquid is made optically dense by ultra-violet light projected from actuating lights. The actuating lights are activated by detectors which detect light from a nuclear explosion. A shield is provided to prevent ultra-violet light other than that from the actuating lights from reaching the contact lenses.

---

Figure 1:
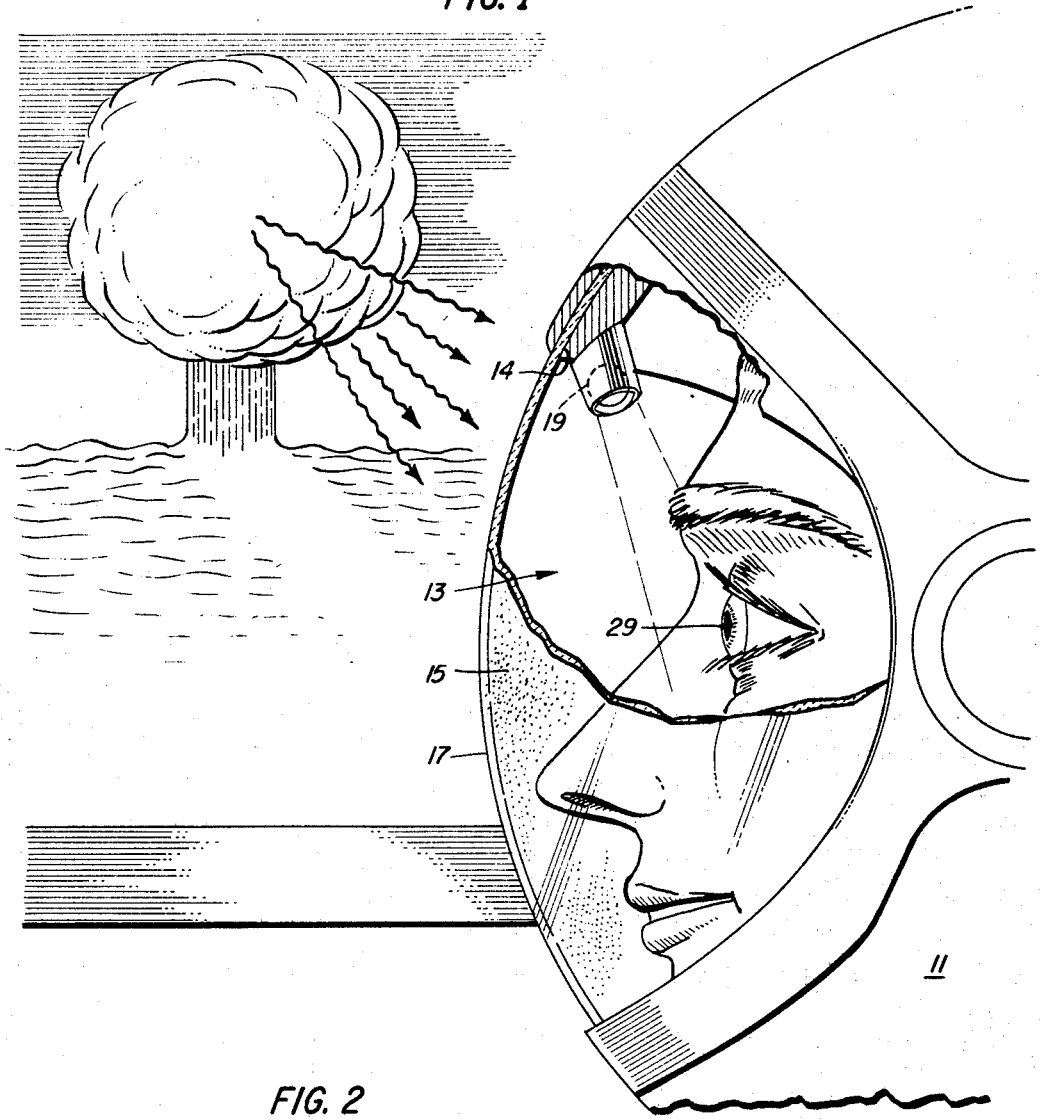

The present invention relates to a flash protecting system and more particularly to a system embodying a contact lens or similar eye covering which protects the human eye from the intense light such as that generated from a nuclear explosion.

A nuclear explosion creates a burst of light of such intensity that it can easily burn the human retina, or cause flash blindness—a condition that temporarily impairs human vision.

Prior art devices designed to protect the human eye from such intense flashes of light generally comprise goggles which mount upon a flight helmet, or the like, and in the presence of an atomic flash close to protect the eye from the damaging light. The methods of closure include the spreading of an opaque material over the goggle lens by an explosive charge, the mechanical closing of shutters, and the reaction of a chemical substance which becomes opaque in the presence of a stimulus. The use of a nontransparent material spread over the goggle lens by an explosive charge is irreversible and once the latter device is triggered, the goggle must be removed and replaced by an unused one for further protection from another intense flash of light. The mechanical shuttered goggle, while being capable of continuous re-use is undesriable since the many tiny strips across the vision field of the user reduces his frontal as well as his peripheral vision. Likewise, the use of a chemical substance which can be stimulated to become opaque has heretofore been formed into protective systems which greatly reduce the peripheral vision of the wearer.

Accordingly, a satisfactory protective device must afford a wide field of vision, must be rapid acting and must be reversible between an optically dense state and a transparent state.

The present invention employs a material which will change from a colorless or tranparent state to a colored or optically dense state when properly energized with light of a predetermined wave-length. Such materials are incorporated into a lens system which contact the eye and which is activated by an independent source of ultra-violet light, for example. The description of the invention will be confined to the structure activated by ultra-violet light for purposes of simplicity; however, it will be understood that other light sources and reacting materials on the lens may be suitable for practicing the invention. The independent source of ultra-violet light is actuated by a sensing system which detects the initial flash from a nuclear detonation or the like.

Accordingly, it is an object of the present invention to provide a protective device which may be operated without obstructing the frontal or peripheral vision of the user.

Another object of the present invention is to provide a protective system in which a photochromic material is employed in conjunction with a lens contacting the eye and which photochromic material will become optically dense once actuated by an ultra-violet light source.

A further object of the present invention is the provision of a protective lens which will protect the eye from any secondary ultra-violet light.

Still another object of the present invention is to provide a protective system in which most of the equipment needed to operate the protective lens may be located away from the user thereby decreasing the fatigue normally experienced from carrying extra equipment over an extended period of time.

Yet another object of the present invention is the provision of a photochromic protecting lens which is reduced in area and thereby requires a lesser amount of output from the operating equipment providing the stimulus for coloring the chemical solution.

Figure 2:
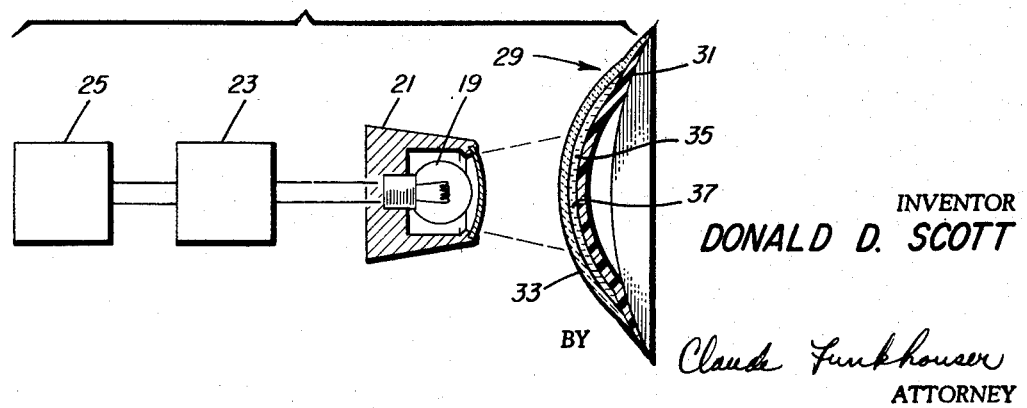

Other objects, advantages and novel features of the invention will become apparent from the following detailed description of the invention when considered in conjunction with the accompanying drawings wherein:

FIG. 1 is a side view showing the present invention incorporated in a flight helmet, said helmet being partially broken away to expose the flash protecting lens covering the user's eye; and FIG. 2 is a view showing one embodiment of the flash protecting lens in cross-section as well as a schematic representation of the necessary electro-optical equipment.

The instant invention utilizes photochromic materials which change from a transparent state to an optically dense state when stimulated or energized with ultra-violet light. Suitable equivalent compounds can be selected from the numerous phototropic compounds which have been synthesized, each of which have their own particular characteristics such as the wave length of maximum absorption, the efficiency and the ultimate maximum density. Photochromic materials come in numerous forms ranging from sheet material to fluids and jellies. The present invention specifies that the photochromic material is in solution in order to achieve a greater sensitivity to ultra-violet light than if the photochromic material was in a dry state.

The protective lens 29 is designed to cover both the sclera and cornea of the eye and is made from two lenses 31, 33 (see FIG. 2). The first, or inner, lens 31 which contacts the eye is formed from an optically ground and polished lens made of a polycarbonate, such as Lexan. This inner lens 31 prevents the entrance of secondary ultra-violet light to the eye from the ultra-violet light source 19. The second, or outer, lens 33 is formed from optically ground and polished quartz which permits the transmission of said secondary ultra-violet light and thus enables the activation of the photochromic chemical between the two lenses. The inner and outer lenses 31 and 33, respectively, are contiguously joined and formed to leave a narrow spherically curved disc-shaped chamber 35. The chamber 35 is approximately 0.003 inch deep, while the base diameter of the spherically curved portion is approximately 0.50 inch wide. The chamber 35 is filled with a photochromic chemical in solution. The solution which is clear in unactivated state becomes colored when stimulated by the presence of ultra-violet light and then reverts rapidly to the clear state when the stimulation ends.

Referring now to FIG. 1, the flash blindness protection apparatus of the present invention is shown incorporated in a flight helmet 11. The flight helmet 11 has a frontal opening 13 therein and a hingeably mounted visor 15 covers the opening 13 under normal operating conditions. The visor 15 is manufactured from a suitable polycarbonate, such as Lexan, which filters the ultraviolet emissions from the electromagnetic spectrum which would otherwise enter helmet opening 13. A gold deposit represented by 17 is applied to the outer surface of the visor 15 which filters infrared emissions from the electromagnetic spectrum. A pair of ultraviolet light sources 19 (one is shown for simplicity) are mounted along the inner rim 14 of the opening 13 with each source focused toward one eye of the person wearing the flight helmet 11. A focusing lens 21 encloses each ultra-violet light source for adjusting the focus of the light from the source toward the user's eye.

As best seen in FIG. 2, the ultra-violet source 19 is connected through a power supply and amplifier 23 to a suitable light-to-electric transducer such as photocell 25. The power supply and amplifier are conventional components which are well-known in the art and need not be described in detail. The photocell 25 can be mounted a suitable distance ahead of the helmet opening 13 in order to detect a flash from a nuclear detonation and leave enough lead time to activate the ultra-violet light 19 which closes the protecting lens as described hereinafter. The power supply and amplifier may also be mounted in the seat of the aircraft thereby reducing the weight of the flight helmet. In order to further reduce the weight borne by the flight helmet, the ultra-violet light may be focused upon the user's eye through optical fiber strands as is well-known in the art with the light source also mounted in the aircraft seat.

The total surface area of two such flash protecting lenses 29 is approximately 2.4 square inches as compared to the 105 square inches of a typical lens system for a conventional goggle. Due to the reduction in surface area the total intensity required from the ultra-violet light which stimulates the photochromic chemical solution can be greatly reduced, along with a corresponding reduction in the power output, weight, and size of the power supply.

In operation, the light from a nuclear detonation energizes the light-to-electric transducer, photocell 25, which triggers the ultra-violet light source 19. This ultra-violet light is focused by lens 21 on the contact lens 29. The ultra-violet light passes through outer lens 33 of the contact lens 29 and stimulates the photochromic solution 37 which becomes optically dense or opaque and thereby prevents the entrance of visable light from the atomic flash. The flash protecting lens does not operate quickly enough to prevent the initial entrance of a small amount of visable light from the atomic flash; however, total closure can be achieved in less than 100 microseconds. This closure time is rapid enough to eliminate the damaging wave lengths within the visual light range before they have had an opportunity to build up heat within the eye and destroy or seriously damage the retina.

While the flash blindness protection apparatus has been described in conjunction with a flight helmet, it should be recognized that it would be obvious to incorporate the apparatus with periscope systems such as are present in submarines, tanks and the like. Furthermore it is not necessary that the flash blindness apparatus of the present invention be employed with a flight helmet filtering means for eliminating ultra-violet and infrared wave lengths as previously described.

Obviously many modifications and variations of the present invention are possible in the light of the above teachings. It is therefore to be understood that within the scope of the appended claims the invention may be practiced otherwise than as specifically described.

What is claimed is:

1. In a system for rapidly attenuating the intensity of light extending from a nuclear detonation to the eye, said system including a detector system connected to a power supply and disposed to detect light from the detonation and to energize in response thereto an actuating light source, the improvement comprising
a lens system disposed in contact with the eye and positioned in the path of the actuating light from the light source; and
light sensitive material forming part of said lens system which becomes optically dense when the actuating light from the source impinges on the light sensitive material, thereupon effectively reducing the light extending from a nuclear detonation to the eye.

2. A system as in claim 1 including
a chamber defined in said lens system; and
said light sensitive material positioned within said chamber.

3. A system as in claim 2 in which
the light sensitive material is a photochromic material in solution; and
the actuating light source is an ultra-violet light means.

4. A system as in claim 1 in which the lens system is a contact lens comprising
an inner lens adapted to contact the eye of the wearer;
an outer lens;
a chamber formed between said inner and outer lens and formed by the contiguous juncture of the outer lens to the inner lens; and
said light sensitive material being positioned within the chamber.

5. A system as defined in claim 4 in which
said inner lens is made from a material which will filter the actuating light from the light source; and
said outer lens is made from a material which permits the transmission of the actuating light from the light source.

6. A system as defined in claim 4 in which
the light sensitive material is a photochromic material in solution; and
the actuating light source is an ultra-violet light means.

7. A system as defined in claim 5 in which
the light sensitive material is a photochromic material in solution; and
the actuating light source is an ultra-violet light means.

8. In a system for rapidly attenuating the intensity of light extending from a nuclear detonation to the eye, said system including a detector connected to a power supply and disposed to detect light from the detonation and to energize in response thereto an actuating light source, the improvement comprising:
a lens system between said eye and said nuclear explosion and positioned in the path of the actuating light from said light source;
light sensitive material forming part of lens system which becomes optically dense when the actuating light from the source impinges on the light sensitive material, thereupon effectively reducing the light extending from the nuclear detonation to the eye; and
filter means to prevent actuating light from any source other than said actuating light source from impinging upon said light sensitive material.

9. A system as recited in claim 8 wherein said filter means comprises:
a flight helmet having a frontal opening and a rim around said opening;
a transparent means covering said opening, said transparent means adapted to filter actuating light from the electromagnetic spectrum falling upon said transparent means;
the actuating light source being mounted on the rim of said helmet opening and positioned to direct the actuating light from the source toward the lens system; and
the power supply and detector system being separated from said helmet and connected to the actuating light source.

10. The combination defined in claim 9 in which:

the light sensitive material is a photochromic material in solution; and the actuating light source comprises an ultra-violet source mounted on the rim of said helmet.

11. In a system for rapidly attenuating the intensity of light extending from a nuclear detonation to the eye, said system including a detector connected to a power supply and disposed to detect light of the detonation and to energize in response thereto an actuating light source, the improvement comprising:

a lens system thin enough to be used as a contact lens between said eye and said nuclear explosion and positioned in the path of the actuating light from the light source;

light sensitive material forming part of said lens system which becomes optically dense when the actuating light from the source impinges on the light sensitive material; and filter means separate from and surrounding said lens system for preventing actuating light from any source other than said actuating light source from impinging upon said light sensitive material.

12. The system of claim 11 wherein said filter means also surrounds said actuating light source.

13. A system as recited in claim 12 wherein said filter means comprises:

a flight helmet having a frontal opening and a rim around said opening;

a transparent means covering said opening, said transparent means adapted to filter actuating light from the electromagnetic spectrum falling upon said transparent means;

the actuating light source being mounted on the rim of said helmet opening and positioned to direct the actuating light from the source toward the lens system; and the power supply and detector system being separated from said helmet and connected to the actuating light source.

14. The combination defined in claim 13 in which:

the light sensitive material is a photochromic material in solution; and the actuating light source comprises an ultra-violet source mounted on the rim of said helmet.

References Cited

UNITED STATES PATENTS 1,929,228  10/1933  Wilhelm.
3,034,403   5/1962  Neefe _____ 351—162
3,152,215  10/1964  Barstow et al.

JEWELL H. PEDERSEN, Primary Examiner

W. L. SIKES, Assistant Examiner

U.S. Cl. X.R.
350—1; 351—162